July 2, 1974 C. A. LEE 3,822,157
REINFORCED NONWOVEN FABRIC AND METHOD OF MANUFACTURE
Original Filed Jan. 29, 1970
4 Sheets-Sheet 1

United States Patent Office 3,822,157
Patented July 2, 1974

3,822,157
REINFORCED NONWOVEN FABRIC AND METHOD OF MANUFACTURE
Charles A. Lee, Knoxville, Tenn., assignor to International Paper Company, New York, N.Y.
Original application Jan. 29, 1970, Ser. No. 6,688, now Patent No. 3,682,755. Divided and this application June 21, 1972, Ser. No. 264,990
Int. Cl. B32b 5/08, 5/10, 5/26
U.S. Cl. 156—85   7 Claims

ABSTRACT OF THE DISCLOSURE

A reinforced laminated nonwoven fabric comprising first and second web plies overlaid with their respective machine directions disposed at an angle with respect to each other and with respect to the longitudinal and transverse directions of the fabric. The first and second web plies are reinforced by respective first and second plies of reinforcing filaments, the filaments of each filament ply being generally aligned with the machine direction of the respective web ply. The plies are bonded one to another.

---

This is a Division of application Ser. No. 6,688, filed Jan. 29, 1970 now U.S. Pat. No. 3,682,755.

This invention relates to laminted nonwoven fabrics, particularly to nonwoven composite fabrics useful in the production of disposable products. This invention also relates to methods for the manufacture of such laminated nonwoven fabrics.

It is desirable that nonwoven fabric be manufactured economically using inexpensive raw materials. It is also desirable that the ultimate physical properties of the fabric, such as strength and absorptivity, make the fabric useful in the manufacture of such items as disposable surgical towels, surgical drapes, hospital or other type clothing, bed sheets, wiping towels, and like items as may appear from time to time. The fabric of this invention may also be useful as a component of a particular product, for example, it may be used in fabricating disposable diapers, pads for incontinents, or the like. It will be appreciated that these and other items are necessarily in many respects diverse as regards their functions, each function dictating specific physical properties of the fabric; yet, in many respects the desired physical characteristics of the products are common to various of the items. For example, surgical towels and hospital bed sheets may be expected to be highly absorptive; and, bed sheets and hospital clothing, along with towels, are expected to exhibit considerable resistance to tear. Moreover, in each instance it is desired that the product be soft and sufficiently pliable, as to drape over a patient or to conform to a surface being wiped in the case of towels. Still further, opacity is desirable in disposable hospital clothing, desired in bed sheets, but of less significance in surgical towels.

Problems in hygiene are self-evident in respect to fabric intended for use in hospitals or related institutions such as doctor offices or clinics. Even though the fabric product is disposable, it may be desirable to sterilize the product before use. Treatment of a medical fabric for the purpose of destroying infectious agencies is usually accomplished through the use of steam under pressure, e.g. in autoclaves. For such uses, the disposable nonwoven fabric is made to be sterilized in an autoclave.

It is of importance in fabrics intended to be used under conditions where the fabric will be subject to abrasive forces that it be of a character such that the fibers or other components thereof will not become dislodged during use to deposit on the surface against which the fabric is abraded. Lint-free fabrics are especially desirable for surgical towels so as to prevent the deposition of lint in open wounds during surgical or first air procedures. One specific problem in fibrous bed sheets or clothing when used in nurseries is the tendency of a baby or small child to scratch particulate matter loose from the sheet or clothing and eventually transfer the loose particulate matter into its mouth. The presence of lint is also objectionable when the lint may deposit as unsightly dust or may create or aggrevate allergic reactions. Transfer of lint from disposable clothing to other objects, including other pieces of clothing, may give rise to distateful appearances and cause consumers to reject the product.

It is known in the art that the addition of sizing materials to cellulosic materials can reduce the problem of lint. Sizing, as a treatment of cellulosic material, generally comprises the addition to the material of resin, strach, or like substances, such additive being distributed substantially throughout the material. Sized fabrics, therefore, are undesirably stiff and do not possess the drape necessary to permit the fabric to conform to the contour of the surface being wiped in the case of toweling, or to permit the fabric to be utilized as clothing which is expected to conform generally to the contour of a human body and bend in accordance with body movements. In addition, overall dispersion of sizing in a fabric makes the fabric harsh to the touch and causes irritation when the fabric contacts tender body areas. The present invention provides a substantially lint-free nonwoven fabric which is desirably soft and flexible.

Hospitals and clinics utilize large quantities of disposable towels, clothing, bed sheets and the like, giving rise to problems of storage of these large quantities of disposable materials in a minimum of space. This storage problem is particularly acute when the individual stored items are bulky, and disposable nonwoven fabric is generally made relatively more bulky than its woven counterpart, this greater bulk being useful in imparting softness, texture, hand or like properties to the nonwoven product. Heretofore storage of large quantities of these disposable products fabricated from bulky nonwoven material has limited their use. The present invention provides, in one embodiment, a disposable product which may be made and stored in a non-bulky state and later conditioned when removed from storage so as to impart the desired bulk to the product. As will be explained further hereinafter, such conditioning may be performed by autoclaving the product, e.g. a surgical towel, just prior to its use. Further, disposable hospital clothing may be stored and likewise conditioned so as to increase its opacity.

It is therefore an object of this invention to provide nonwoven fabric whose physical properties such as strength, softness and absorptivity make the fabric useful as a substitute for woven materials. It is also an object to provide a method for the manufacture of nonwoven fabrics from inexpensive raw materials and at relatively low cost. It is a further object to provide a nonwoven fabric having increased strength and specifically having a high strength to weight ratio. It is a further object to provide a substantially lint-free nonwoven fabric. It is a further object to provide a novel fiberglass fabric.

Other objects and advantages of the present invention will become known by references to the following description and the accompanying drawings. In the drawings.

With reference to the drawings, in accordance with the present invention, a soft, strong, nonwoven fabric 10 is provided by bonding a plurality of filaments 12 to a flat web 13 with the filaments generally aligned with the machine direction of the web, spirally-winding the fiament-bearing web into a tubular configuration, and collapsing the tube to form a flat sheet comprising inner plies of crossing filaments 12 interposed between outer web plies 14, 15 whose machine directions are disposed at an angle, e.g. obliquely, with respect to the longitudinal direction of the fabric 10. Bonding of the crossed filaments one to another at their intersections and bonding of the webs to the crossed filaments are also provided for.

It is contemplated in this invention that the base web 13 may comprise such materials as creped tissue of various basis weights or webs of spread tow as will be more fully discussed hereinafter. Such web are conventionally said to possess a machine direction, defined as the direction of the web parallel to its forward movement during manufacture. Many webs are stronger in their machine direction than in their cross direction, e.g., transversely of their machine direction.

Figure 4:
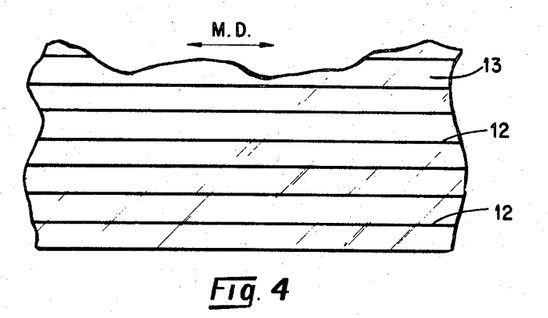
FIG. 4 is a representation of a portion of one embodiment of a base web having a plurality of discrete reinforcing filaments bonded thereon in accordance with the present invention.
Figure 5:
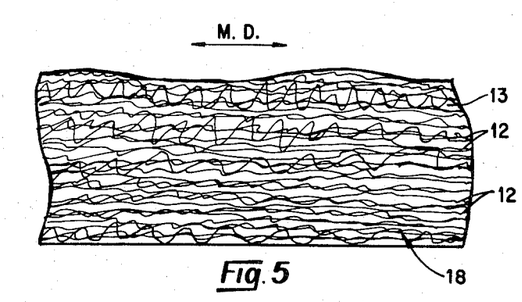
FIG. 5 is a repersentation of a portion of a further embodiment of a base web having a plurality of entangled reinforcing filaments bonded thereon in accordance with the present invention.

The base web 13 may be reinforced with discrete filaments 12 as depicted in FIG. 4, each spaced apart from adjacent filaments without interfilament contact, or with a filamentary mat 18 as depicted in FIG. 5 where there is entanglement or contact between the individual filament 12. In any event, however, the individual reinforcing filaments preferably are generally directed in a single direction and are disposed on a base web with their alignment direction substantially parallel to the machine direction of the base web and bonded thereto.

The reinforcing filaments 12 of the present invention may be bonded to a base web 13 by means of adhesive disposed between the web and filaments, or in some instances, the filaments and/or the base web may be heat-bondable so as to require only heat to effect the desired bonding. Alternatively, the adhesive itself may be heat-bondable thermoplastic material.

In producing the fabric of the present invention, it has been found preferable to lay down a plurality of filaments upon a flat base web 13 as an initial step. One acceptable base web may be creped tissue having a crepe ratio of between about 1.2 and 1.5, and a basis weight between about 5 and 16 pounds per ream of 2880 sq. ft. Typically, creped tissue has a fiber length between about 1/32 and 1/8 inch, but many other fiber lengths in the base material are acceptable for use in the present invention.

Creped tissue is normally low in wet strength, disintegrating into small fragments very soon after being wetted. Commonly, sizing or wet strength resins of various types have been added to the tissue to increase its wet strength. Such additives made the tissue stiff and harsh to the touch and destroyed its absorptivity. According to the present invention, such sizes or wet strength resins are unnecessary and even undesirable. In the present invention, all or most of the individual fibers of a tissue web are bonded to at least one of a plurality of relatively strong reinforcing filaments so as to cause the individual fibers to remain adhered to such filaments upon the fabric being subjected to moisture or even immersed in water or other liquid. Still further the product remains intact even when wrung to expel the liquid which it has absorbed. Moreover, it has been discovered that by appropriately spacing the reinforcing filaments, the individual fibers of the tissue web may be tenaciously held within the fabric product so as to substantially eliminate their dislodgment as lint. Whereas sizing or the addition of wet strength resin reduces the absorptivity of tissue webs, either by penetrating the individual fibers and destroying their absorptivity or by substantially coating the fibers and rendering them impenetratable by liquids, in the present invention the individual fibers are preferably each bonded at one or a few isolated points along the fiber length to a reinforcing filament. That is, in many fibers, only one end of the fiber will be adhered to a filament, its other end being free of bonds. Other fibers will be bonded only at their points of contact with a reinforcing filament. In accordance with the concepts of the present invention, therefore, the original highly absorptive nature of the tissue web is not destroyed by the web-to-filament bonds. Importantly, however, each fiber is preferably bonded to at least one filament, thereby creating a product wherein the fibers or fragments of tissue will not readily become dislodged during use of the product.

Moreover, in the tissue production process, the web fibers often assume a predominant orientation along the machine direction of the web. In addition, the lines of creping of the tissue extend transversely of the web by virtue of the circumstances of its manufacture. Accordingly, many tissue webs display markedly lower resistance to rupture when stressed in the cross direction than when stressed in the machine direction. As will appear more fully from subsequent discussion herein, generally aligned reinforcing filaments are applied to the web with the direction of filament alignment substantially parallel to the machine direction of the web, and the reinforced web is subsequently bias laid to achieve substantial strength in the longitudinal, transverse and diagonal directions of the fabric product.

It also has been found acceptable to form the fabric from a base web 13 formed of spread tow comprising a large number of long, preferably continuous filaments mutually entangled and bonded at many or all of their points of contact to form a coherent web. Tow normally comprises a very large number of continuous filaments (ends) in either monofilament or multi-filament structure in bundle form. The bundle is often produced by simultaneously spinning a very large number of synthetic filaments, such as polyester filaments, and collecting the spun filaments as a group. The long filaments of the bundle, of course, are substantially parallel but there is extensive interentwining or entanglement of neighboring filaments. Such a bundle may be spread into a flat web by well-known air spreading techniques. As desired, the web may be treated to render it more stable or coherent, as by applying an adhesive to bond the filaments one to another at their points of contact or, in the case of thermoplastic filaments, by passing the spread tow through a heated nip to effect bonding between filaments. As may be visualized, the spread fibers produce a gossamer web wherein the individual fibers extend generally parallel to one another in the machine direction of the web but are in contact with neighboring filaments at many points along the length of the web. In a base web produced from spread tow, the individual fibers are long, as distinguished from the relatively short fibers found in creped tissue. Tow of nylon, acetate, rayon, acrylic, polyester, mineral (e.g. glass), or the like may be employed in the present invention, depending primarily upon the properties desired in the fabric product. As will appear more fully hereinafter, spread tow may also form the reinforcing filaments 12 as well as the base web 13 itself.

Extensible reinforced fabrics appear to find more end uses than do inextensible fabrics. However, the present invention contemplates both such types of fabric, and only the appropriate combinations of components are used as will produce the desired product, for example, extensible reinforcing filaments may be used to make extensible fabrics. Creped tissue, by virtue of its transversely oriented lines of creping, possesses such extensibility in its machine direction. Certain tow filaments are inherently elastic thereby causing the spread tow web to be extensible, and the extensibility of such filaments can be increased, or inelastic filaments or fibers may be made extensible, by crimping the tow, preferably before spreading, so as to impart extensibility to the web in a direction substantially perpendicular to the crimp lines. By means of the present invention, the extensibility of either type of web may be carried over into the fabric product so as to produce an extensible product. The choice of reinforcing filaments employed for a given product is significant and will be discussed hereinafter.

As stated above, extensible fabrics appear to find more end uses than inextensible fabrics. They also have been found to exhibit unusual strength properties, due in part to their ability to absorb both stress and impact forces. It is recognized, however, that nonextensible fabric products are desirable for certain end uses. Such fabrics may be made according to the present invention, as by using uncrimped glass fiber tow, which is relatively inextensible.

Both the creped tissue and spread tow webs of this invention are individually flimsy and somewhat gossamer. They possess low resistance to rupture, at least in the cross direction, and are individually unsuitable for producing such items as bed sheets, toweling, clothing, wipes, etc. The webs, however, are soft, pliable and relatively inexpensive. Each web presents a relatively even surface irrespective of the creping or crimping of the respective web fibers and when serving as the outermost layers of the fabric of this invention, imparts good hand to the fabric.

As referred to hereinbefore, the reinforcing filaments may comprise a plurality of discrete filaments 12 such as depicted in FIG. 4, or they may be in the form of a gossamer mat 18 such as depicted in FIG. 5. Preferably, the reinforcing filaments are laid down on a base web generally parallel to the machine direction of the base web. Base web materials usually exhibit greatest strength in a direction parallel to their respective machine direction. Disposing the reinforcing filaments substantially parallel to the greatest direction of strength of the web reinforces it in its direction of greatest strength and produces maximum strength in the web in such single direction. When the reinforced web subsequently is overlaid on itself or another reinforced web with directions of maximum strength of each ply disposed obliquely to the other, e.g., at right angles, and obliquely to the longitudinal direction of the formed fabric, the resultant laminated fabric exhibits great strength in all directions.

It has been noted that various types of filaments having diverse properties may be suitable for use in the present invention. As stated, the synthetic filaments are inherently extensible, some to a greater extent than others. On the other hand, glass filaments possess little, if any, stretchability. Moreover, certain of the filament types shrink upon being subjected to elevated temperatures. Accordingly, as the end use of the fabric product dictates, appropriate filaments exhibiting the desired physical characteristics may be chosen for reinforcing the web base material. Specifically, heat shrinkable filaments, such as organic polymer filaments exhibiting high shrinkage upon being subject to elevated temperatures, may be preferred when the fabric is to be used as surgical toweling. The toweling may be produced in a smooth flat sheet occupying minimum storage space, and upon being sterilized in an autoclave, the filaments shrink and create, a crinkling of the fabric and resultant textured surfaces closely resembling woven fabrics. On the other hand, a dimensionally stable surgical drape may be produced employing glass tow base web, reinforced with glass filaments and subsequently formed into a flat sheet as described herein.

Preferably, the reinforcing filaments are sufficiently small in diameter as will permit their being disposed between two outer web plies 14, 15 without producing undesirable ridges or impressions on the outer surface of the fabric. Larger diameter filaments may be used, however. These larger filaments are frequently stronger and often can be made to impart a definite texture to the outer surfaces of the fabric as a consequence of their impressions appearing on such outer surfaces. Individual filaments, either singularly or in mat form, having a denier on the order of 50 and exhibiting about 6 grams per denier tensile strength have been found useful in producing a variety of suitable disposable products, such as bed sheets, surgical wipes, and the like.

The benefits of the present invention have been found best obtained through the use of either thermoplastic filaments or a thermoplastic adhesive disposed on the reinforcing filaments, or even thermoplastic base webs. Such thermoplastic materials provide a desirable bond between the reinforcing filaments and their respective base webs. Also, as will be discussed hereinafter, they may be made to effect further bonds to overlaid webs by later softening them by the application of heat and, while the thermoplastic materials are soft, pressing the filaments and webs together, as by passing overlaid reinforced webs through a heated nip. Preferably each reinforcing filament is individually passed through a thermoplastic adhesive prior to laying down of the filament onto a bass web. Mats of reinforcing filaments may have adhesive applied thereto by similarly passing the mat through an adhesive. One acceptable adhesive comprises an acrylic latex resin (such as that sold under the trade name Geon latex by B. F. Goodrich Company). This resin adheres to most filaments in the form of a uniform coating. Other acceptable adhesives, for example, a polyvinyl acetate sold by Monsanto Company under the trade name Gelva TS100, have been noted to adhere to certain filaments in irregularly-spaced droplets as distinguished from a continuous uniform coat of adhesive on each filament.

Figure 3:
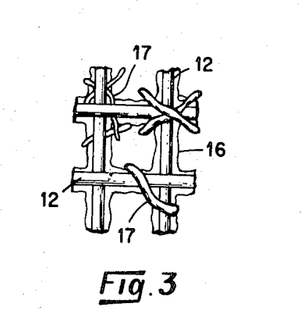
FIG. 3 is a fragmentary illustration depicting the spaced apart and crossed reinforcing filaments of one embodiment of this invention and fibers bonded to the filaments.

Referring to FIG. 3 it has been discovered that, when heated at least to its film-forming temperature, adhesive 16 applied to the individual filaments 12 becomes dispersed around the circumference and along each filament to form a film of adhesive over substantially the entire surface of each filament. Importantly, this film forming process also has been found to spread the adhesive laterally of each filament 12 into the base web immediately adjacent the filaments. In addition, the adhesive spreads from each filament and penetrates into the web to contact underlying fibers.

As depicted in FIG. 3, in the initial fabrication step of laying down the reinforcing filaments, the individual fibers 17 of each web ply adhere to those filaments aligned with the machine direction of such web. By spacing the reinforcing filaments apart from one another by a distance not greater than on the order of the typical fiber length of the fibrous web plus about twice the average distance which the adhesive extends laterally of each filament, substantially each individual fiber of the web will be adjacent a reinforcing filament and be bonded thereto, creating a very coherent fabric. Beneficially, this fiber bonding does not result in the deposition of adhesive over the entire surface of each fiber 17, but there are substantial portions of many fibers which receive no adhesive and thus retain their softness and absorptivity in the fabric product.

It is preferred to space the reinforcing filaments as set forth above, but it is to be noted that it may be desirable in certain instances to produce fabrics having fewer reinforcing filaments per unit of web width. Such fabrics are weaker, however, and exhibit increased tendency to deposit lint, etc. Moreover, it is acceptable to overlay two reinforced webs, one web having closely spaced filaments (e.g. about one fiber length apart) and the other web having more widely spaced filaments. In such products, the filament spacing is determined principally by the end use and desired properties of the fabric product. It is preferable that the filaments be laid down generally parallel to the machine direction of the web and generally perpendicularly to the lines of creping or crimping of the web, for the reasons discussed hereinbefore.

The reinforced webs produced as set forth above are useful as they exist, for limited applications. As indicated hereinbefore, however, a fabric having greatly improved strength properties may be obtained by spirally winding one or more reinforced webs into a tubular configuration, preferably with the reinforcing filaments on the inside of the tube, collapsing such tube into a flat sheet having outer web plies overlying inner plies of cross-threads, and bonding the plies to create a strong coherent fabric.

Figure 1:
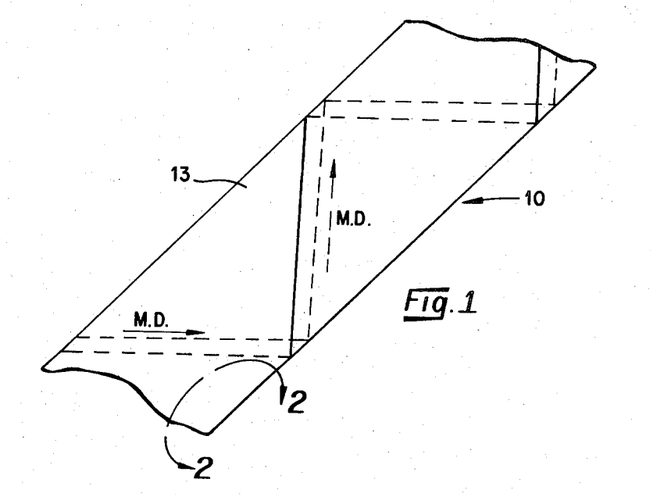
FIG. 1 is a representation of one embodiment of the reinforced nonwoven fabric of the present invention and depicts the fabric obtained by spirally-winding a single reinforced web with the web edges overlapping slightly.
Figure 2:
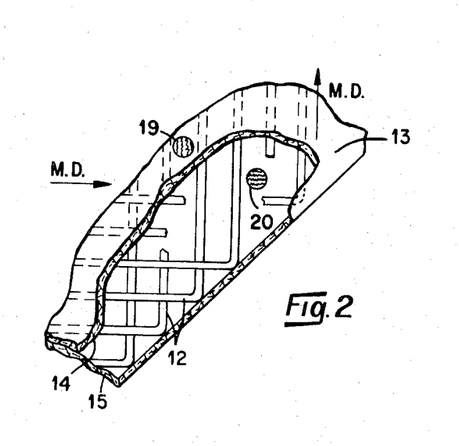
FIG. 2 is an expanded view, part cut-away, of a portion of the fabric shown in FIG. 1, such portion being the encircled corner indicated by the numerals 2—2 of FIG. 1.
Figure 6:
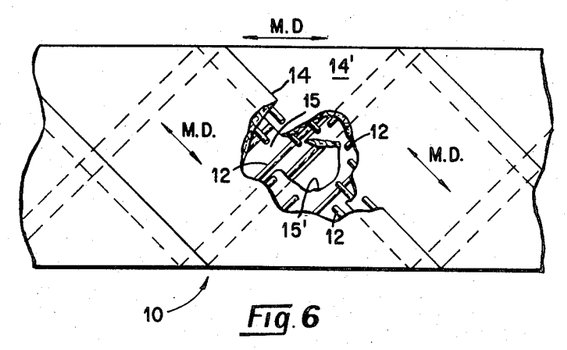
FIG. 6 is a representation of a further embodiment of the fabric product of the present invention, partly cut-away and grossly out of scale for reasons of clarity, depicting a product obtained by simultaneously bias laying two separate reinforced base webs with the web edges overlapping slightly.

This spiral winding and collapsing procedure produces fabrics 10 such as are depicted in FIGS. 1 and 6. The fabric comprises at least two outer web plies 14, 15 (also 14', 15' in the product produced from two simultaneously spirally-wound reinforced webs and depicted in FIG. 6) whose respective reinforcing filaments 12 are disposed facing each other and crossing each other. The angle at which the respective filaments of respective overlaid webs cross is established by the angle at which the respective web is laid down with respect to the longitudinal direction of the spirally wound sheet. Detailed sections in FIG. 2 depict the lines of creping 19, 20 in the outer web plies 14 and 15 are show that the respective crepe lines of the outer web plies are also disposed obliquely to each other and to the longitudinal dimension of the fabric. In accordance with this invention, the angle of bias between the direction of the reinforcing filaments and the longitudinal direction of the fabric may be between about 15 and 75 degrees with a 45° bias angle being preferred so that the overlaid filaments cross each other at right angles and are further disposed at 45° angles with respect to the longitudinal direction of the fabric. When the reinforced webs are overlaid in this preferred manner, the fabric is uniquely strong in that the product exhibit substantial strength and elongation in the direction of its length, width, and diagonally of its length.

When employing thermoplastic filaments or adhesive, it has been found possible to enhance both the strength of the fabric and its coherence, including its lint-free characteristic, by passing the collapsed sheet through a heated nip. As the collapsed bias-laid sheet is passed through the heated nip, the thermoplastic material is softened and the pressure in the nip forces the crossed filaments into intimate contact with each other at their intersections. The filaments then bond one to another. Additionally, the nip pressure enhances lateral dispersion of the adhesive into the fibrous web and, due to the controlled filament spacing, individual fibers of the web become bonded to at least one filament, and numerous fibers of each web become bonded to the fibers and filaments of the superposed other web to cerate the reinforced fabric of this invention. The filament-to-filament bonding of the present fabric establishes a multiplicity of interweb bonds. Also, there is produced a bond between the individual fibers of one web ply and the filaments reinforcing the other web ply to develop a network of criss-crossed bonds adhering the overlaid webs together in a flat sheet. This network of bonds has been found to provide a very desirable degree of flexibility in the product and at the same time restrict interweb movement such that the fabric product exhibits an increased ability to absorb energy without rupture. Moreover, the improved adherence obtained by passing the overlaid webs through a heated nip reduces the degree of web overlap during spiral winding which may be necessary to insure a coherent fabric sheet. Similar bonding may be obtained using thermoplastic base webs.

Figure 7:
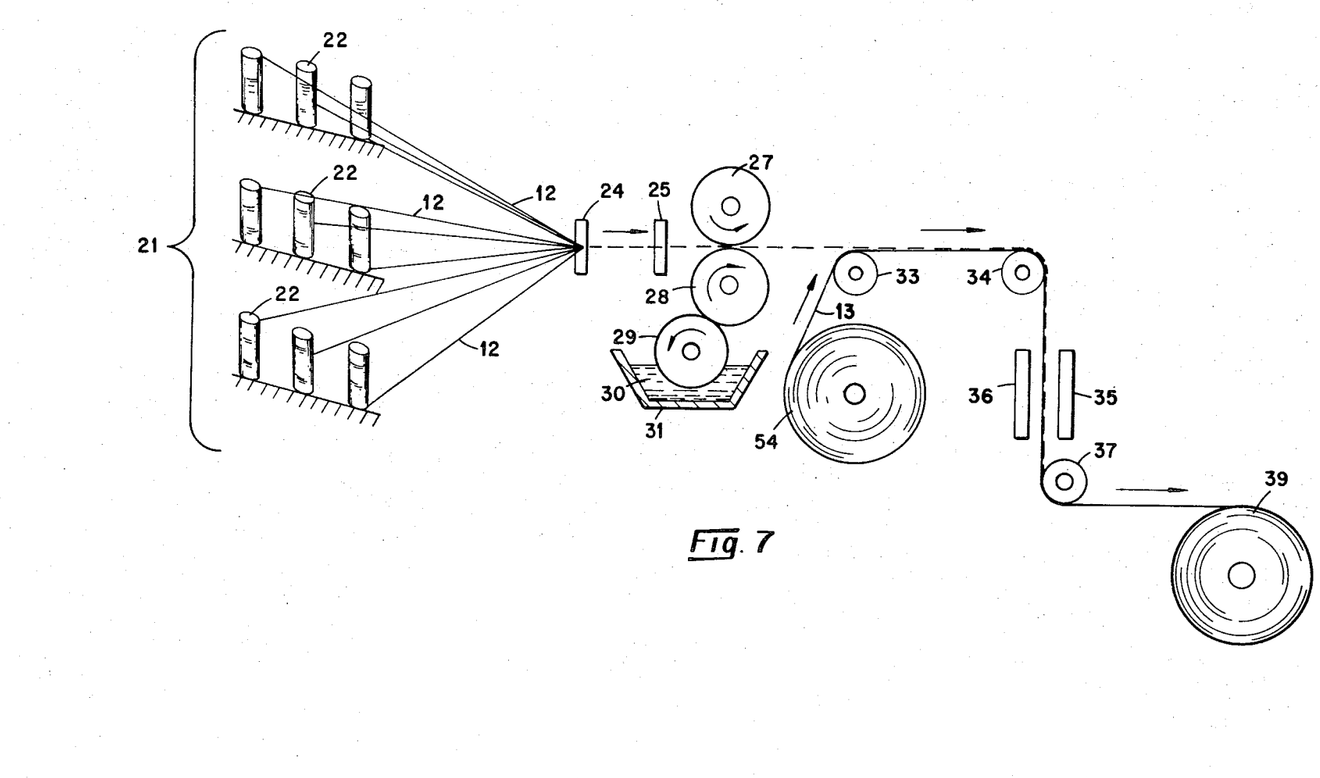
FIG. 7 is a representation of apparatus for applying reinforcing filaments to a base web.
Figure 8:
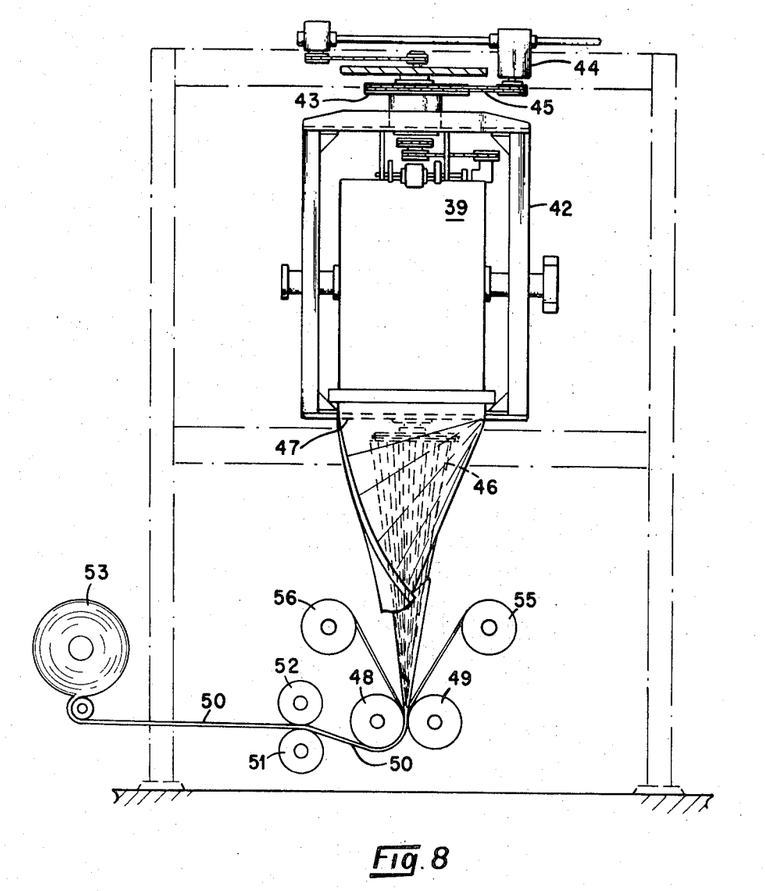
FIG. 8 is a representation of apparatus for bias laying reinforced base webs in accordance with the present invention.

For purposes of this disclosure, apparatus for producing the fabric product of this invention is depicted in two parts. FIG. 7 depicts the first part and shows one embodiment of apparatus for laying reinforcing filaments 12 on a base web 13. FIG. 8 depicts the second part and shows one embodiment of apparatus for spirally winding one or more reinforced webs into a tubular configuration, collapsing such tube into a flat sheet, and bonding the overlaid plies.

With specific reference to FIG. 7, a plurality of reinforcing filaments 12 are dispensed from spools 22 held in creel 21 and passed forwardly through an eye-board 24, thence through a comb 25 which maintains the individual filament 12 spaced apart and aligns them in a selected plane. In the present embodiment this plane extends perpendicularly to the plane of FIG. 7 so as to present the several filaments simultaneously to the nip between a printing roll 28 and a meter roll 27. Individual spools 22 may be provided with brake means (not shown) for establishing a hold-back pressure on each filament 12 for the purpose of stretching the filaments as desired prior to bonding them to the base web.

A fountain roll 29, partly immersed beneath the surface of an adhesive 30 contained in an elongated tank 31 disposed beneath the roll 29 picks up the adhesive from the tank 31 and transfers a metered quantity thereof to the printing roll 28 at the nip between the fountain roll and printing roll. Preferably, the thickness of the film of adhesive on the printing roll is maintained sufficiently great so that a filament passing through the nip between the rolls 27 and 28 will be completely covered with adhesive as it passes through such nip. It is preferable that each filament pick up a uniform coat of adhesive as it passes through the nip. On the other hand, as has been pointed out, the filaments may pick up adhesive in the form of somewhat irregularly spaced droplets which flow together upon being heated to their film-forming temperature and thereupon form a uniform adhesive coat on each filament.

The adhesive-bearing filaments 12 are laid down in continuous fashion upon the base web 13 as it is fed from a roll 54 over idler roll 33 simultaneously with the adhesive-bearing filaments 12. The web with the filaments thereon is passed over an idler roll 34 and directed vertically between a set of heater banks 35, 36 maintained at a temperature at least as high as the film-forming temperature of the adhesive so as to insure that the adhesive thoroughly coats each filament and also to cause the adhesive to migrate from each filament into the base web. Also, as the web and adhesive-bearnig filaments pass between the heater banks, the adhesive is at least partly dried and the filaments adhered to the web.

Adhesive migration laterally from each filament and its contact with individual fibers of the base web is depicted in FIG. 3. Preferably the adhesive is of a type which will not penetrate the fibers to destroy their absorptivity but will remain as a film on a portion of the outer fiber surface. Moreover, control over the quantity and viscosity of the adhesive deposited on each filament is maintained so as to limit lateral migration to prevent substantial blocking of the interstices between fibers with resultant stiffness in the fabric and destruction of its softness and absorptivity. A film of adhesive over the entire surface of each filament assures the presence of adhesive at each filament-to-filament intersection when the reinforced web is bias-laid, and hence insures a bond at each such intersection. Such a film also provides adhesive in position to adhere the fibers of an overlaid web to such adhesive-coated filaments as set forth hereinbefore.

The web with its adhered filaments is passed over an idler roll 37 and preferably collected as by wind-up roll 39.

For some uses of the fabric the relative hold-back pressures of the base web 13 and reinforcing filaments 12 are selectively adjusted so that the filaments may be stressed and laid down on the web while in such a stressed state. This stress in the filaments is retained in the filament-bearing web as collected. During subsequent bias laying of the web, this stress is relaxed, causing the web to be gathered by the filaments and assume a crinkled or textured physical appearance. In the bias-laid fabric, such crinkled webs impart bulk to the product, such bulk being controllable through selection of the initial stress imparted to the reinforcing filaments.

Bias-laying of the filament-bearing web hereinbefore described is effected by spirally winding, collapsing and depicted in FIG. 8. The apparatus depicted in FIG. 8 shows only one roll 39 of reinforced web being spirally-wound so as to overlay the web upon itself in the flat finished fabric. This fabric is depicted in FIG. 1. The same type apparatus may be provided with a second parent roll of reinforced webs simultaneously. A product so produced is depicted in FIG. 6.

Referring specifically to FIG. 8, a roll 39 of reinforced web is rotatably mounted on a platform 42 which is itself rotated by a sprocket 43 connected to a drive motor 44 by a chain 45. A mandrel 46 depends from the bottom 47 of the platform 42 and is rotated relatively counter to the platform 42 so as to remain stationary. Through the use of guide apparatus the reinforced web is spirally wound about the mandrel 46 to form a tube. At the same time, the tube is continuously collapsed and withdrawn from the mandrel by rolls 48, 49. As may be visualized from FIG. 8, the tube is collapsed progressively as it is drawn from mandrel 46. Upon passing through the nip of rolls 48, 49, the tube is collapsed completely into a flat sheet 50.

Subsequent treatment of the flat sheet 50 to effect ply bonding depends upon the materials used in fabricating the reinforced web, e.g., whether such materials are thermoplastic. In the present embodiment, at least one component of the flat sheet is thermoplastic. Accordingly, the flat sheet 50 is passed through the nip between a heated roll 51 and a back-up roll 52, whereupon the thermoplastic component, for example, thermoplastic adhesive, is softened by the applied heat and while soft, is pressed into contact with the other components to effect bonding of the several plies into a coherent laminated fabric. The fabric is collected as by a wind-up roll 53.

Particularly when producing fabrics having creped tissue outer web plies bonded to inner plies of reinforcing filaments by a thermoplastic adhesive, the heat and pressure applied to the flat sheet 50 by passing it through the heated nip between rolls 51, 52 insures the desired lateral migration of the adhesive into the fibrous structure of each web ply. The pressure in such nip also presses each outer web ply into contact with the reinforcing filaments immediately underlying the opposite outer web ply thereby effecting bonding of each outer web ply to both inner plies of reinforcing filaments. This bonding action enhances the strength of the product and assures that substantially all of the individual fibers of the creped tissue web plies are bonded to at least one reinforcing filament.

As has been stated, the method of the present invention may be used to produce various products. For example, the present method may be employed to produce a strong coherent gossamer fabric. Specifically, fabrics may be made from webs formed by opening, i.e. spreading, tow bundles having total deniers between 50,000 and about 600,000 to a width of about 10 to more than 100 inches. Each filament of such tow bundles may have a denier between about 1.5 and 30. Depending upon the chosen combination of total denier, denier per filament, and width of the spread web, it is possible to make webs having between less than a hundred to several thousand ends per inch of web width. Such webs may be very light weight. For example, a 50,000 denier tow bundle, each filament thereof having a denier of 2.25, when opened to 105 inches, produces a web having a weight less than about 0.3 oz./yd.$^2$. Such spread tow webs may be stabilized with a polyvinyl acrylic adhesive, spirally wound into a tube, collapsed to produce a multi-plied flat sheet, and the plies bonded to produce a product which exhibits an exceptionally large strength per unit weight of fabric. As indicated hereinbefore, the spread tow web may be reinforced with discrete filaments or a spread tow mat or it may itself serve as reinforcing.

A further unique product obtainable through use of the present invention is a strong nonextensible surgical drape which is also flame resistant. This product is produced by reinforcing a matted glass web with glass filaments and overlaying the reinforced web as described above. As described before with reference to creped tissue outer web plies, the fibrous matter of the glass outer web plies is adhesively bonded to the reinforcing filaments and retained within the fabric. This fabric is particularly useful in surgical drapes for the reason that the fabric develops little or no static electricity during use and can be used freely in the presence of flammable vapors such as the ether or oxygen employed in operating rooms.

EXAMPLE I

A fabric was produced employing the concepts set forth hereinbefore. In this example, 735 nylon multifilaments 12 each 50 denier and having a tensile strength of 6 grams per denier, were fed forwardly through the nip between the printing roll 28 and meter roll 27 where each filament was provided with a uniform coat of an acrylic latex adhesive sold by B. F. Goodrich Company under the trade name of Geon latex.

The adhesive-bearing filaments were then laid down upon a web 13 of creped tissue as the filaments and web were passed simultaneously around an idler roll 33. The creped tissue sheet had a basis weight of 9 pounds per ream of 2880 sq. ft. and a crepe ratio of 1.3. In this example, the tissue web was 105 inches wide and the filaments were substantially equally spaced so as to provide 7 ends per inch of web width. The filament-bearing tissue was then directed between opposite parallel heater banks where it was heated to at least about 150° F.

Two of these reinforced tissue webs (as distinguished from the single web depicted in FIG. 8) were simultaneously and continuously spirally wound into a tubular geometry and collapsed to form a flat sheet comprising outer plies of tissue web and and inner plies of crossed filaments. This product is depicted in FIG. 6. This sheet was then passed through the nip of a set of heated rolls whereupon the combination of heat and pressure caused the adhesive to soften and spread such that the filaments were bonded one to another at their crossings and the fibers of each tissue web were more thoroughly bonded to the filaments immediately underlying such web. Additionally, many of the fibers of each web were pressed into adhesive contact with the filaments associated with the other outer tissue web, thus effecting a substantial bond throughout the thickness of the laminated fabric and assuring that substantially all fibers of the tissue webs were bonded to at least one filament.

The bursting strength (Mullen test) of this product was 22.5 lbs. in the dry state and 20.5 lbs. when thoroughly wetted with water, indicating the greatly increased strength of the product as compared to the non-reinforced tissue webs. No lint or fragments were noted when the product ruptured. Likewise, there was no evidence of lint or dislodged fragments when the fabric product was rubbed over an abrasive surface representative of a typical end use of the product.

The product exhibited elongation values of 32.6% 28.3% and 30.2% when stretched in its machine direction, cross direction and diagonally of its length, respectively. These values show the ability of the product to absorb stress and impact forces in several directions.

The product was further tested by subjecting the fabric product to repeated stressing in a variety of directions, whereupon it was observed that even though the fibers of the tissue webs separated from one another, the fabric did not rupture. Such testing also revealed the capability of the product to retain the individual tissue web fibers attached to the several reinforcing filaments even after rupture or the pullting away of one or more filaments from the body of the fabric.

The absorbency rate of the product was 2.5 seconds, tested in accordance with TAPPI Standard T432ts–64 (0.10 ml.), which is well within the usualy acceptable absorbency rates for toweling, wipes and the like. Its basis weight was 23.7 pounds per ream of 2880 square feet.

The tensile strengths of the product when measured along its longitudinal (machine) direction and transverse (cross) direction were 1.8 and 1.9 pounds per inch of sample width, respectively. The product tensile strength was 5.6 pounds per inch of sample width when measured in a direction parallel to the filaments of one ply of reinforcing filaments (at an angle to the filaments of the other ply of reinforcing filaments).

EXAMPLE II

A further fabric was made employing a synthetic tow. Prior to spreading, the tow comprised a bundle of long, continuous crimped 2.5 denier polyester filaments, having a total denier of 100,000. This bundle was spread by air spreaders to a width of 105 inches to produce a gossamer web, the filaments of which were oriented generally parallel to each other and to the length of the web. The filaments, however, were substantially entangled with neighboring filaments along their lengths.

The spread tow was passed throuhg the nip between a printing roll and a meter roll where an ethylenevinyl acetate derivative adhesive was applied to the individual filaments of the web. This adhesive is sold under the trade name of Elvase PB–31872 by E. I. du Pont de Nemours. The adhesive-bearing web was directed between opposed heater banks and heated so as to insure dispersion of the adhesive over the entire surface of each filament of the web and to effect at least partial drying of the adhesive and bonding of the filaments one to another at their points of contact. This procedure stabilized the web in its spread state.

Two such webs were spirally wound, collapsed and bonded as explained hereinbefore with reference to FIG. 8 (two web rolls were employed as distinguished from the single web roll depicted in FIG. 8). The flat sheet product was passed through a heated nip where the thermoplastic adhesive disposed on each filament was softened and the filaments pressed into contact at their points of crossing to produce bonding and a coherent bias-laid fabric.

The product of this example possessed a weight of 0.95 ounces per square yard. Its tensile strength was 5.7 pounds per inch of sample width in the longitudinal direction, 7.8 pounds per inch of sample width in the transverse direction and 10.3 pounds per inch of sample width in the diagonal direction, indicating exceptional strengths per unit weight of fabric. Its bursting strength (Mullen test) was 43 p.s.i. The product was soft and pliable.

EXAMPLE III

A further fabric was made in accordance with the present method and employing the tow described in Example II. In the present example, the spread tow web, with Elvase adhesive thereon, was laid down on a creped tissue web having a basis weight of 9 pounds per ream of 2880 square feet and a crepe ratio of 1.3. The web with the overlaid spread tow (105 inches wide) was passed between heater banks to bond the tow to the tissue web and two such reinforced webs were formed into a laminated fabric as in Example I.

Upon testing, this product exhibited elongations of 88.9%, 91.2% and 60.0% in its machine direction, cross direction and diagonally of its length, respectively. Its absorbency rate was 2.5 seconds (TAPPI T432ts–64).

The burst strength of this tow-reinforced fabric was 56 lbs. (dry) and 55.5 lbs. (wet) (Mullen test).

EXAMPLE IV

A dimensionally stable fabric was produced by reinforcing a glass base web with a plurality of glass filaments as in Example 1.

The bias laid fabric product obtained was subjected to steam of 250° F. pound pressure for one hour which is representative of the usual sterilization procedure employed in hospitals, clinics, and the like. Measurement of the product dimensions before and after such autoclave treatment revealed no appreciable change in either the width or length of the fabric.

Various modifications may be made within the scope of the invention. For example, the reinforcing filaments may be disposed on the outermost surface of the fabric instead of or in addition to their being disposed inwardly of the laminated fabric. In those fabrics having external reinforcing filaments, the web plies may be bonded by disposing thermoplastic adhesive on that surface of each web opposite its reinforcements and passing the overlaid webs through a heated nip to effect bonding on one web to the other. Further, the webs may be thermoplastic so as to bond one to the other when overlaid and passed through a heated nip. Also, additional plies, either reinforced or non-reinforced, may be added to the fabric as from web rolls 55, 56 of FIG. 8. As desired such additional plies may be provided with adhesive and bonded to the bias laid fabric by the rolls 51, 52 with the reinforcements of the added webs running in the machine direction of the fabric. Various features believed to be novel are included in the following claims.

What is claimed is:

1. A method for the manufacture of a laminated nonwoven fabric comprising the steps of
    aligning a plurality of reinforcing filaments in laterally spaced apart relation to one another in a plane,
    applying a thermoplastic adhesive to each of said filaments along substantially its entire length,
    overlaying said adhesive-bearing aligned reinforcing filaments on a fibrous base web having a machine direction and including a plurality of individual fibers each of which has a discrete length, said alignment direction of said filaments being generally aligned with the machine direction of said base web,
    heating said base web and said filaments to at least the film-forming temperature of said thermoplastic adhesive to cause said adhesive to migrate along said filaments and into the fibrous structure of said base web, said lateral space between adjacent filaments being not greater than about the typical length of the fibers of said base web plus about twice the average distance which said adhesive migrates laterally of each filament when said filament is overlaid on said base web to bond substantial numbers of said fibers to at least one of said filaments, spirally winding said reinforced web into a tubular structure, collapsing said tubular structure to provide a flat fabric sheet comprising a plurality of plies, and
    bonding at least the innermost ones of said plies to create a coherent laminated fabric.

2. The method of Claim 1 wherein said spiral winding step includes positioning of the reinforcing filaments inwardly of the tubular structure during such spiral winding so as to position said reinforcing filaments between plies of said base web when said tubular structure is collapsed to a flat sheet.

3. The method of Claim 1 wherein said reinforcing filaments are heat-shrinkable and including the step of autoclaving said laminated fabric to shrink said reinforcing filaments.

4. The method of Claim 1 wherein additional reinforcing filaments are disposed on said fabric sheet generally aligned in the longitudinal direction of the sheet, and are bonded thereto.

5. The method of Claim 1 further comprising disposing additional reinforcing filaments on a second base web having a machine direction with the direction of said additional reinforcing filaments generally aligned with the machine direction of said second base web, bonding said additional reinforcing filaments to said second base web to reinforce said second base web in its machine direction, disposing said reinforced second web on said flat fabric sheet with the machine direction of said second web in the longitudinal direction of the sheet, and bonding said reinforced second web to said sheet.

6. The method of Claim 1 wherein the step of bonding said plurality of plies of said flat fabric sheet includes heating said plies to at least the film-forming temperature of said adhesive and while so heated, passing said plies through a pressure nip to transfer portions of adhesive from the filaments of one ply to portions of the base web of the overlying ply and thereby bond said plies together at spaced apart locations between adjacent filaments of said base web over a substantial portion of the area of said overlying plies.

7. The method of Claim 1 wherein said spirally winding step comprises simultaneously spirally winding at least two of said reinforced webs into a tubular structure.

References Cited

UNITED STATES PATENTS

| | | | |
|---|---|---|---|
| 1,515,792 | 11/1924 | Respess | 156—179 |
| 3,180,775 | 4/1965 | Sexsmith | 156—85 |
| 3,615,976 | 10/1971 | Endres | 156—183 |
| 3,616,129 | 10/1971 | Sager | 156—178 |
| 3,623,927 | 11/1971 | Watson | 156—171 |
| 3,625,791 | 12/1971 | Lee et al. | 156—194 |
| 3,627,621 | 12/1971 | Mowers | 156—179 |
| 2,213,290 | 9/1940 | Rowe | 156—171 |
| 3,424,833 | 1/1969 | Mazzolini | 156—183 |
| 3,692,603 | 9/1972 | Rhodes | 156—85 |

DANIEL J. FRITSCH, Primary Examiner

U.S. Cl. X.R.

156—178, 179, 184, 192, 194, 198, 199, 436, 459

UNITED STATES PATENT OFFICE
CERTIFICATE OF CORRECTION

Patent No. 3,822,157　　　　　Dated July 2, 1974

Inventor(s) Charles A. Lee

It is certified that error appears in the above-identified patent and that said Letters Patent are hereby corrected as shown below:

Col. 3, line 36, "web" should be -- webs --

Col. 6, line 33, "bass" should be -- base --

Col. 7, line 19, "cross-threads" should be -- crossed threads --

Col. 7, line 33, "are show" should be -- and show --

Col. 7, line 62, "cerate" should be -- create --

Col. 8, line 17, "filament" should be -- filaments --

Col. 9, lines 17 & 18, after "and" insert -- bonding the reinforced web through use of the apparatus --

Col. 9, line 23, "reinforced webs simultaneously" should read -- reinforced web and may be employed to spirally wind two reinforced webs simultaneously. --

Col. 11, line 11, "pullting" should be -- pulling --

Col. 11, line 38, "throuhg" should be -- through --

Col. 12, line 16, "pound" should be -- pounds --

Signed and sealed this 3rd day of December 1974.

(SEAL)
Attest:

McCOY M. GIBSON JR.
Attesting Officer

C. MARSHALL DANN
Commissioner of Patents